April 21, 1970   D. W. R. LAWSON   3,507,355
MULTI-LAYER FACE MATERIAL FOR SOUND ABSORPTIVE
DUCT LINING MATERIAL
Filed May 22, 1969   2 Sheets-Sheet 1

INVENTOR.

BY DALE W.R. LAWSON

Edwin D. Grant

ATTORNEY

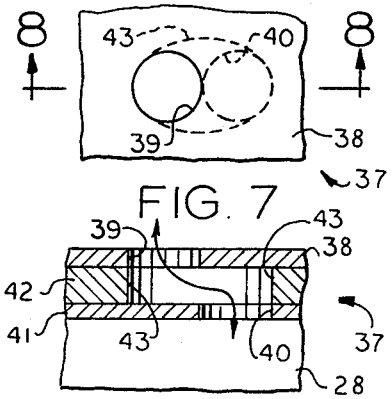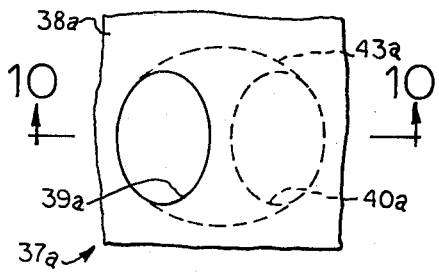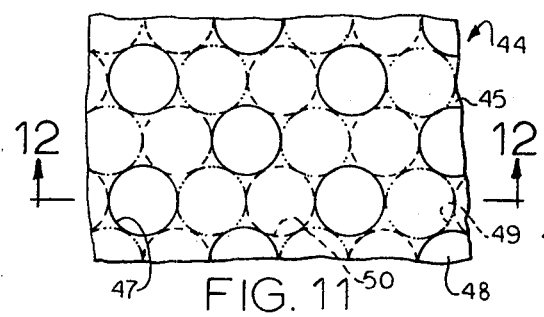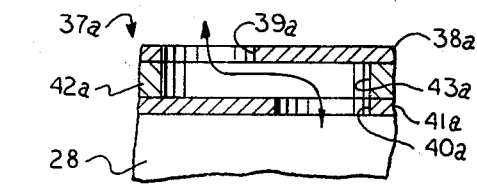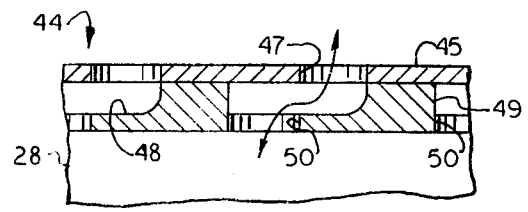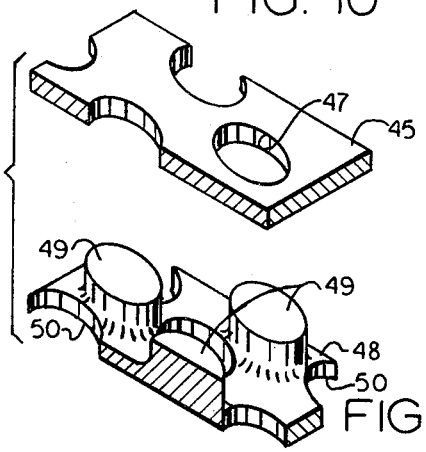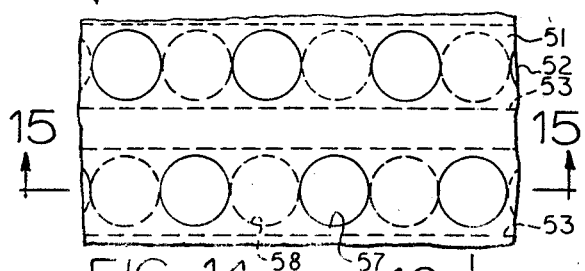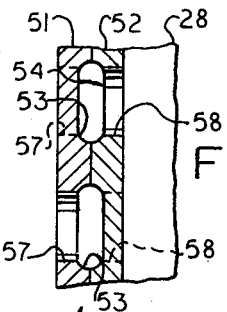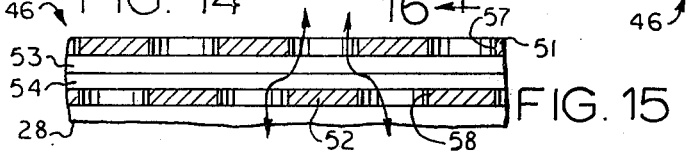

United States Patent Office 3,507,355
Patented Apr. 21, 1970

3,507,355
MULTI-LAYER FACE MATERIAL FOR SOUND ABSORPTIVE DUCT LINING MATERIAL
Dale W. R. Lawson, Bonita, Calif., assignor to Rohr Corporation, Chula Vista, Calif., a corporation of California
Filed May 22, 1969, Ser. No. 826,821
Int. Cl. F01n *1/02;* G10k *11/00*
U.S. Cl. 181—48      10 Claims

ABSTRACT OF THE DISCLOSURE

A thin, porous, multi-layer, sound absorptive face material is separated a known distance from a backing sheet by a layer of core material to provide one or more resonant backing cavities. The face material comprises a plurality of relatively superposed layers of sheet material, the outer and inner layers each having a multiplicity of small openings therein. Each opening in the outer layer opens into an intermediate space provided between the outer and inner layers, as does each opening in the inner layer; and each opening in the outer layer is offset laterally from, and in open communication, through the intermediate space, with at least one opening in the inner layer to provide a multiplicity of indirect, or tortuous passages through the multi-layer face material. The core material comprises a honeycomb structure with notches in the edges thereof adjoining the backing sheet to drain off water or other liquid which may tend to accumulate therein.

BACKGROUND OF THE INVENTION

The suppression of noise created by jet engines in aircraft has become a matter of critical importance. As a result of the almost complete transition in recent years from piston type to jet engines in large commercial and military aircraft, coupled with the tremendous increase in air traffic into and out of airports located in heavily populated areas in the vicinity of large cities, a substantial reduction in the permissible noise level created by jet engined aircraft flying at low altitudes over such populated areas is in the process of being rapidly brought under legislative control. Intensive studies have been made, and are now in progress, in an effort to develop acoustically absorbent materials for lining the inlet and exit duct areas of a jet engine in the vicinity of the turbine fan, wherein noise is generated by the fan blade tips passing at high velocity in proximity to the fixed stator and flow strengthening blades.

A presently known type of sound absorbing duct lining material for use injet engines comprises a face layer of thin, perforated sheet material, such as aluminum, suspended a known distance from a solid backing surface, with the perforated face layer exposed to the noise-carrying gases flowing through the duct lined with the material. The space between the face layer and the backing surface forms a resonant cavity, and sound waves transmitted by the gases to which the face layer is exposed cause a molecular flow into and out of the chamber through the perforations in the face layer, so that a part of the sonic energy is transformed into heat, which is carried away by the flowing gases, and a part is changed into sound of different wave lengths. However, such known duct lining material is limited in its absorptive capacity due to the fact that its absorptive efficiency is nonlinear with respect to acoustical power variation, that is, such known material is tuned to a specific acoustical power level associated with a specific engine power setting, and at other acoustic power levels, associated with increased or decreased engine power settings, absorpitve efficiency decreases.

At times water may tend to accumulate in the core structure which supports the face material in spaced relation to the backing sheet to provide a resonant cavity, and such water may change the resonance characteristics of the cavity, or in freezing may damage the duct lining material.

SUMMARY OF THE INVENTION

A general objective of the present invention is to provide a sound absorptive duct lining material for jet engines, which material will have substantial sound absorptive capacity throughout a substantial range of variation in wave length and in acoustic power level as measured in decibels, without materially affecting the gas flow through the duct. It is a further objective of the invention to provide a sound absorptive duct lining material for use in the inlet, rotor and exit zones of a jet engine, which material can be formed in a conventional manner, as by stretch forming, and which will have a structural function as a part of the duct. Another objective of the invention is to provide a porous surfaced, sound absorptive, duct lining material wherein the porosity of the surface exposed to the sound carrying gases within a duct lined by the material can be "tuned" or varied along the length of the duct for optimum attenuation of sound of different wave lengths and levels of acoustic power. Another objective of the invention is to provide a sound absorbent duct lining material which will approach substantially linear absorption characteristics over a sound wave frequency range of 1000 to 5000 c.p.s., and at high intensity acoustic power levels typical of turbofan and turbojet engines, and will be effective for attenuating the noises which are produced within the duct during critical periods of landing approach and takeoff. A further objective of the invention is to provide a self-draining duct lining material.

BRIEF DESCRIPTION OF THE DRAWINGS

The foregoing objectives of the invention, together with the structure and manner of operation of an illustrative embodiment of the invention, along with several modifications thereof, will be apparent from the following description and the accompanying drawings, wherein:

FIG. 7 is a fragmentary, plan view showing a portion of another form of duct lining material embodying the invention.

FIG. 8 is a transverse, sectional view taken along line 8—8 of FIG. 7.

FIG. 9 is a fragmentary plan view showing a portion of another form of duct lining material embodying the invention.

FIG. 10 is a sectional view taken along line 10—10 of FIG. 9.

FIG. 11 is a fragmentary, plan view of a portion of another form of duct lining material embodying the invention.

FIG. 12 is a transverse, sectional view taken along line 12—12 of FIG. 11.

FIG. 13 is an exploded view of a fragment of the material shown in FIGS. 11 and 12.

FIG. 14 is a fragmentary, plan view of a portion of another form of duct lining material embodying the invention.

FIGS. 15 and 16 are sectional views taken along lines 15—15 and 16—16, respectively, of FIG. 14.

DETAILED DESCRIPTION

Figure 1:
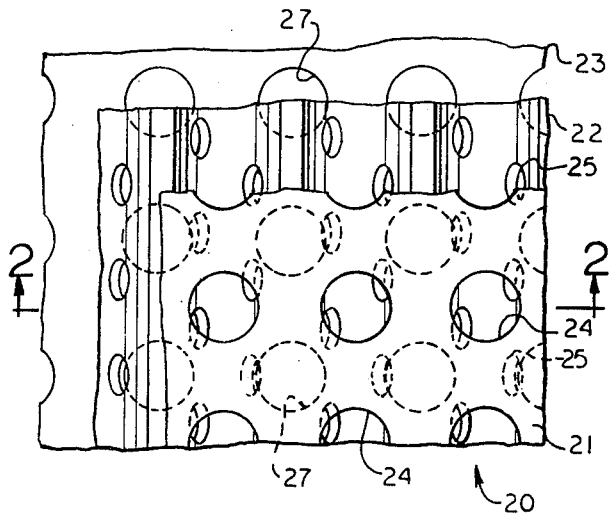
FIG. 1 is a fragmentary, enlarged, plan view of a small portion of one form of sound absorbent, duct lining material embodying the present invention, marginal portions of the upper and intermediate layers being broken away.
Figure 2:
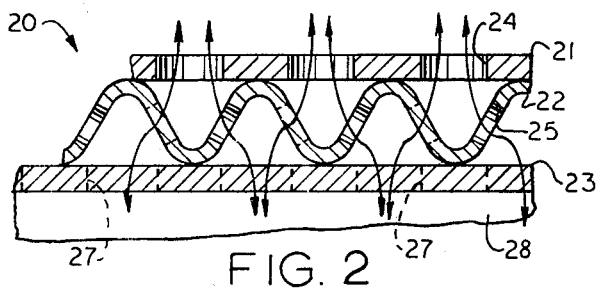
FIG. 2 is a sectional view taken along line 2—2 of FIG. 1, the arrows indicating indirect passages through the face layer or skin.

Referring to the drawings in detail, and considering, first, the form of the invention shown in FIGS. 1 and 2, a three-layer face material 20 comprises a flat outer layer 21, a corrugated intermediate layer 22, and a flat inner layer 23. The three layers 21, 22, and 23 are secured together in closely superposed relation by suitable means such as, for example, brazing, welding, or a suitable adhesive such as epoxy resin.

The outer layer 21 has a multiplicity of small openings 24 of selected size or sizes therein, said openings being disposed in symmetrically spaced rows along the outwardly facing troughs of the corrugations of the intermediate layer 22. The corrugated intermediate layer 22 has a multiplicity of small openings 25 therein, said openings being disposed in rows along both sloping sides of each corrugation thereof.

The inner layer 23 has a multiplicity of small openings 27 of selected size or sizes therein, said openings being disposed in symmetrically spaced rows along the inwardly facing troughs of the corrugations of the intermediate layer 22. The openings 27 in the inner layer 23 are offset longitudinally from the corrugations in the intermediate layer 22 and from the openings 24 in the outer layer 21. Thus, any molecular flow through the multi-layer facing material 20 will follow the indirect or tortuous paths indicated in part by the arrows in FIG. 2.

Figure 6:
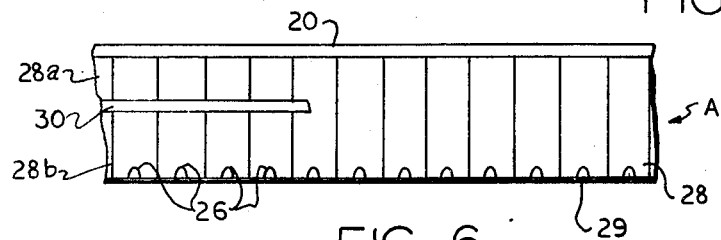
FIG. 6 is a fragmentary, somewhat diagrammatic, transverse, sectional view in reduced scale of a complete sound absorbent duct lining material for a jet engine, a fragment of an optional, intermediate layer of porous material being shown at the left hand end portion.

To provide a complete duct lining material A as shown in FIG. 6, a multi-layer face material, such as, for example, that 20 shown in FIGS. 1 and 2, is combined with a suitable resonant cavity backing structure comprising a honeycomb formation 28 of light gauge sheet metal, such as, for example, aluminum or stainless steel, backed by a layer 29 of sheet metal or other suitable material to provide a backing surface for the resonant cavity. If desired, an intermediate stratum 30 of suitable porous, sound absorptive material, which may be a multi-layer material embodying the present invention, may be interposed between a first layer 28a, and a second layer 28b of honeycomb material as shown in the left hand portion of FIG. 6. A plurality of notches 26 are provided in the edges of the honeycomb formation 28 to drain off any liquid which may tend to accumulate therein.

The entire duct lining material A is of suitable thickness, as dictated by the acoustic and structural design requirements for each duct in which it is to be installed. Usually this thickness will be somewhere between one third and one and one half inches. As in other types of sound absorptive duct lining material, the effective porosity of the multi-layer face material is a function of the velocity of the gas flow past it, and since the holes in the intermediate and inner layers 22 and 23 are not directly exposed to the flowing gases in the duct, the holes in these two layers may be smaller than those in the outer or exposed layer 21 and still be capable of handling without restriction the full impact of sonic energy and molecular flow to which they are exposed through the openings 24 in the outer layer 21.

A workable overall thickness for one design of multi-layer face material 20 is .10 inch, with hole diameters in the outer layer 21 from .04 to .12 inch in diameter, based in part on a flow resistance varying between 5 and 40 Rayle. To date however it is not feasible to determine the full effect of all variables presented, and each installation must be tailored to its specific requirements, preferably using test methods which duplicate the requirements of the installation.

Figure 3:
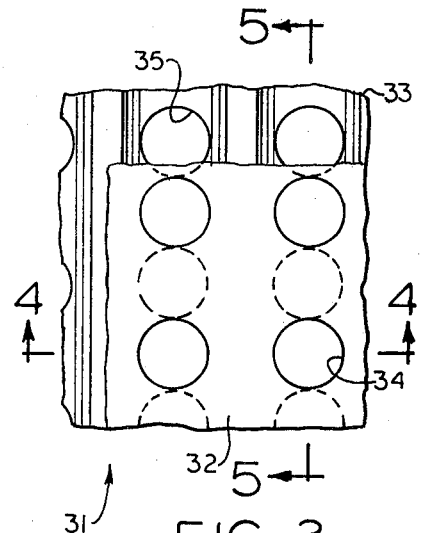
FIG. 3 is a fragmentary, plan view of a portion of another form of duct lining material embodying the invention.
Figure 4:
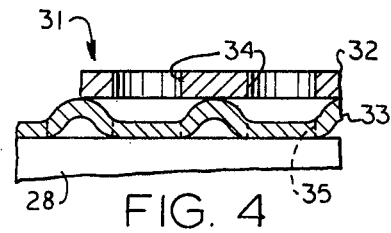
FIGS. 4 and 5 are sectional views of FIG. 3, taken along lines 4—4 and 5—5, respectively.
Figure 5:
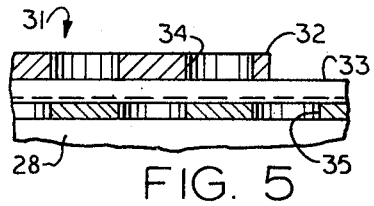

A modified form of the invention is shown in FIGS. 3, 4 and 5, and comprises a multi-layer face material 31 comprising a flat outer layer 32 and a corrugated inner layer 33, attached to each other along the tops of the corrugations in the inner layer. The bottoms of the corrugations are flat, and openings 34 in the outer layer 32 are arranged in spaced apart relation in rows along the outwardly facing troughs between adjacent corrugations of the inner layer 33. Openings 34 in the inner layer 33 are arranged in spaced apart relation in rows along the flat bottoms of the corrugations in the inner layer 33. The two layers 32 and 33 are so arranged that the openings 35 in the inner layer 33 lie midway between the openings 34 in the outer layer 32, see FIG. 5.

In the form of the invention shown in FIGS. 7 and 8, a three layer face material 37 comprises a flat outer layer 38 having a multiplicity of openings 39 which are offset laterally from a similar plurality of openings 40 in a flat inner layer 41. A flat intermediate layer 42 is interposed between, and attached to, the layers 38 and 41, and has a similar plurality of larger openings 43 therein, each of which is of a size, and is so positioned, that it encircles one opening in each of the outer and inner layers.

The modification shown in FIGS. 9 and 10 is generally similar to that shown in FIGS. 7 and 8, and the same reference numerals are, therefore, used to designate the various parts, with the suffix *a* added. The difference between the form of the invention shown in FIGS. 9 and 10 and that shown in FIGS. 7 and 8 lies in the fact that the openings 39a and 40a in the outer and inner layers 38a and 41a, respectively, are spaced laterally farther apart, and the openings 43a in the intermediate layer 42a are larger than their respective counterparts in FIGS. 7 and 8, so as to provide a longer indirect passage through the composite face material 37a as is apparent from the arrows in FIGS. 8 and 10.

In the form of the invention shown in FIGS. 11–13 the multi-layer face material 44 comprises a flat outer layer 45 having a multiplicity of small openings 47 of selected size or sizes therein, and an inner layer 48, the latter being chem-milled to provide a multiplicity of protuberances 49 which hold the outer layer 45 spaced from the remainder of the inner layer 48. A multiplicity of openings 50 are provided in the inner layer 48, and are so located that when the two layers 45 and 48 are assembled as shown in FIGS. 11 and 12 the openings 47 in the outer layer 45 are offset laterally from openings 50 in the inner layer 48 to provide indirect passages through the multi-layer assembly indicated in part by the arrow in FIG. 12. In this structure shown in FIGS. 11–13 it is obvious that each hole in both the outer and inner layers 45 and 48 is in communication with the entire open space between the two layers provided by the protuberances 45, so that in addition to the paths indicated by the arrow in FIG. 12, there will also be a considerable amount of flow along indiscriminate, indirect paths in the intermediate space between the two layers 45 and 48.

In the form of the invention shown in FIGS. 14–16, a two-ply face material 46 comprises two relatively superposed layers 51 and 52, having channels 53 and 54, respectively therein. These channels may be chem-milled in the adjoining faces of the layers 51 and 52, with openings 57 and 58, spaced apart and arranged in rows along the bottoms of their respective channels 53 and 54. The layers 51 and 52 are assembled with the channels 53 and 54 in register with each other and the openings 57 in the outer layer 51 interposed between adjacent openings 58 in the inner layer 52. This structural arrangement provides indirect passages through the multi-layer skin as indicated by the arrows in FIG. 15, although it is obvious that the space provided by each registering pair of channels 53 and 54 in the two layers 51 and 52 is in open communication with all of the holes in both layers opening into such space.

OPERATION

In the operation of the form of the invention shown in FIGS. 1, 2 and 6 will be described briefly, and from this it will be obvious to anyone familiar with the art how the other illustrative forms of the invention operate.

After suitable tests and calculations have been made to determine the overall thickness of the face material 20, the thickness and spacing of the three layers 21, 22, and 23, the size or sizes of the openings required for each of the three layers 21, 22 and 23, the depth and structural type of backing cavity or cavities required, as determined by the sound energy (decibels), sound wave frequency spectra, opposing duct wall spacing, duct chamber size, and gas flow velocity during the phase or phases of operation wherein maximum attenuation is desired, the duct lining A is made in accordance with these requirements and is formed by well known procedures, i.e., stretch forming etc., to conform to the shape of the individual duct (not shown) for which it is intended.

From this point on, the duct lining will continue to operate in a sound attenuating capacity by controlling sound-propelled molecular flow from the interior of the duct, through the indirect or tortuous passages indicated by the arrows in the various figures into and out of the backing cavity provided by the honeycomb and foil structure 28 and 29. The notches 26 in the lower edges of the honeycomb structure allow any water which might tend to collect therein to drain off to a low point where a conventional sump or outlet, not shown, may be provided for its disposal.

The invention provides a duct lining material for jet engines which is capable of being tailored to various sound absorptive capabilities with respect to the requirements of each duct in which it is to be installed, so as to have peak effectiveness in the areas where maximum attenuation is required. It does not add materially to weight over current non-attenuating duct structures, and is capable of being manufactured, formed and installed without substantial increase in cost over current practices. It has greater structural strength, and at a lesser cost and weight, then sintered metal fiber mat, one form of sound absorptive duct lining material now being tried.

What is claimed as new and useful and desired to be secured by U.S. Letters Patent is:

1. A multi-layer face material for a sound absorptive duct liner of the type comprising a perforated face material spaced from a backing surface to provide a resonant chamber between the face material and the backing surface, said face material comprising:

an outer layer of thin sheet material having a multiplicity of small holes therein of selected size and spaced apart, an inner layer mounted beneath the outer layer and having also a multiplicity of small holes therein of selected size and spaced apart, the holes of the inner layer being offset laterally from those in the outer layer, means spacing portions of the inner layer from the outer layer to provide one or more spaces between said layers, each hole in the outer layer opening into a space thus provided between the outer and inner layers, and each opening in the inner layer also opening into a space between the two layers, whereby each hole in the outer layer is in open communication with one or more of the holes in the inner layer.

2. A multi-layer face material for a duct liner as claimed in claim 1 wherein the means spacing portions of the inner layer from the outer layer comprises a layer of corrugated sheet material interposed between the outer and inner layers, and the three layers are interconnected in closely superposed relation, the sides of the corrugations of the corrugated intermediate layer having holes therein to communicate the outwardly facing troughs between adjacent corrugations on the outer side of the intermediate layer with the inwardly facing troughs between adjacent corrugations on the inner side of the corrugated intermediate layer.

3. A multi-layer face material for a duct liner as claimed in claim 2 wherein the holes in the outer layer are aligned parallel to, and open into the outwardly facing troughs on the outer side of the intermediate layer, and the holes in the inner layer are parallel to, and open into the inwardly facing troughs between adjacent corrugations on the inner side of the corrugated intermediate layer.

4. A multi-layer face material for a duct liner as claimed in claim 1 wherein the face material comprises two superposed layers, an outer layer and a corrugated inner layer, and the means spacing portions of the inner layer from the outer layer comprises the outwardly extending ridges of the corrugated inner layer.

5. A multi-layer face material for a duct liner as claimed in claim 2 wherein the holes in the outer layer open into the outwardly facing troughs of the corrugations of the inner layer, and the holes in the inner layer open also into said same outwardly facing troughs.

6. A multi-layer face material for a duct liner as claimed in claim 4 wherein the bottoms of the outwardly facing troughs of the inner layer are substantially flat, the holes in the outer layer are aligned in rows, and the two layers are superposed with the rows of holes in the outer layer located over the outwardly facing troughs of the corrugations of the inner layer, and the holes in the inner layer are also aligned in rows located in the substantially flat bottoms of the outwardly facing troughs of the inner layer.

7. A multi-layer face material for a duct liner as claimed in claim 1 wherein the face material comprises an outer layer, an intermediate layer, and an inner layer, the three layers are secured together in directly superposed relation, the intermediate layer has a plurality of holes therein larger than the holes in either the outer or the inner layer, and each hole in the intermediate layer is in open communication with at least one hole in each of the outer and inner layers.

8. A multi-layer face material for a duct liner as claimed in claim 1 comprising an outer and an inner layer, wherein the inner layer has a plurality of protuberances projecting from the upper side thereof, and the outer layer is secured to the tops of the protuberances.

9. A multi-layer face material for a duct liner as claimed in claim 1 comprising an outer and an inner layer, wherein a plurality of grooves are provided in the inner face of the outer layer, a similar plurality of grooves are provided in the outer face of the inner layer, the outer and inner layers are secured together in superposed relation with the grooves in the outer and inner layers in register with each other, and the holes in the outer and inner layers open into the spaces provided by the registering grooves of the two layers.

10. A multi-layer face material as claimed in claim 1 wherein the face material is spaced from the backing surface by a honeycomb structure of sheet material interposed between, and in edgewise contact with, both the face material and the backing surface, and the edges of the honeycomb material adjacent the backing surface have a plurality of drainage notches therein to drain off any liquid which may tend to collect in the honeycomb structure.

References Cited

UNITED STATES PATENTS

| | | | |
|---|---|---|---|
| 2,826,261 | 3/1958 | Eckel | 181—42 |
| 3,113,634 | 12/1963 | Watters | 181—50 XR |
| 3,166,149 | 1/1965 | Hulse et al. | 181—33.1 |
| 3,286,787 | 11/1966 | Wirt | 181—50 XR |

FOREIGN PATENTS

| | | |
|---|---|---|
| 222,770 | 7/1959 | Australia. |

ROBERT S. WARD, JR., Primary Examiner

U.S. Cl. X.R.

181—33, 42